United States Patent [19]

Lücke et al.

[11] Patent Number: 5,247,052
[45] Date of Patent: Sep. 21, 1993

[54] FINE-GRAINED POLYETHER-KETONE POWDER, PROCESS FOR THE MANUFACTURE THEREOF, AND THE USE THEREOF

[75] Inventors: Andreas Lücke, Waldbrunn; Dieter Steidl, Hofheim am Taunus, both of Fed. Rep. of Germany

[73] Assignee: Hoechst Aktiengesellschaft, Fed. Rep. of Germany

[21] Appl. No.: 891,779

[22] Filed: Jun. 1, 1992

Related U.S. Application Data

[63] Continuation of Ser. No. 458,766, Dec. 29, 1989, abandoned.

[30] Foreign Application Priority Data

Dec. 31, 1988 [DE] Fed. Rep. of Germany ....... 3844457

[51] Int. Cl.⁵ .................................................. C08G 8/02
[52] U.S. Cl. ..................................... 528/125; 525/153
[58] Field of Search ......................... 528/125; 525/153

[56] References Cited

U.S. PATENT DOCUMENTS

| | | | |
|---|---|---|---|
| Re. 32,595 | 2/1988 | Davis | 156/308.2 |
| 4,440,916 | 4/1984 | Waters et al. | 525/54.2 |
| 4,578,427 | 3/1986 | Saito et al. | 525/150 |
| 4,703,075 | 10/1987 | Egami | 524/269 |
| 4,957,962 | 9/1990 | Winkler et al. | 524/538 |
| 4,977,218 | 12/1990 | Gardner et al. | 525/329.3 |

FOREIGN PATENT DOCUMENTS 0139279 5/1985 European Pat. Off. .
0362525 4/1990 European Pat. Off. .

OTHER PUBLICATIONS

Plastics Engineering, Band 44, Sep. 1988 "Pulverizing PEEK without cryogenics".
Soviet Inventions Illustrated, Woche 8431, Sep. 1984.
ANTEC 1988 Conference Proceedings of the Society of Plastics Engineers, Atlanta, Apr. 18-21, 1988.

*Primary Examiner*—John Kight, III
*Assistant Examiner*—T. Mosley

[57] ABSTRACT

A fine-grained polyether-ketone powder, having a particle size with a $d_{50}$ value smaller than or equal to 40 μm and a grain size distribution range smaller than or equal to 55 μm, is obtained by cold-grinding of coarse-grained polyether-ketone in a fluid-bed opposed-jets mill, which is provided with a grinding chamber (2) subjected to gas jets, a grinding material-charging device, a screening device (5) for separating coarse material (11) and fine material (10), and a bottom (3) underneath the grinding chamber for added material to be ground and coarse material flowing back from the screening device, the material to be ground and the coarse material flowing back from the screening device being cooled by means of a cryogenic refrigerant.

The powders obtained in this way are used for producing surface coatings or composites.

16 Claims, 2 Drawing Sheets

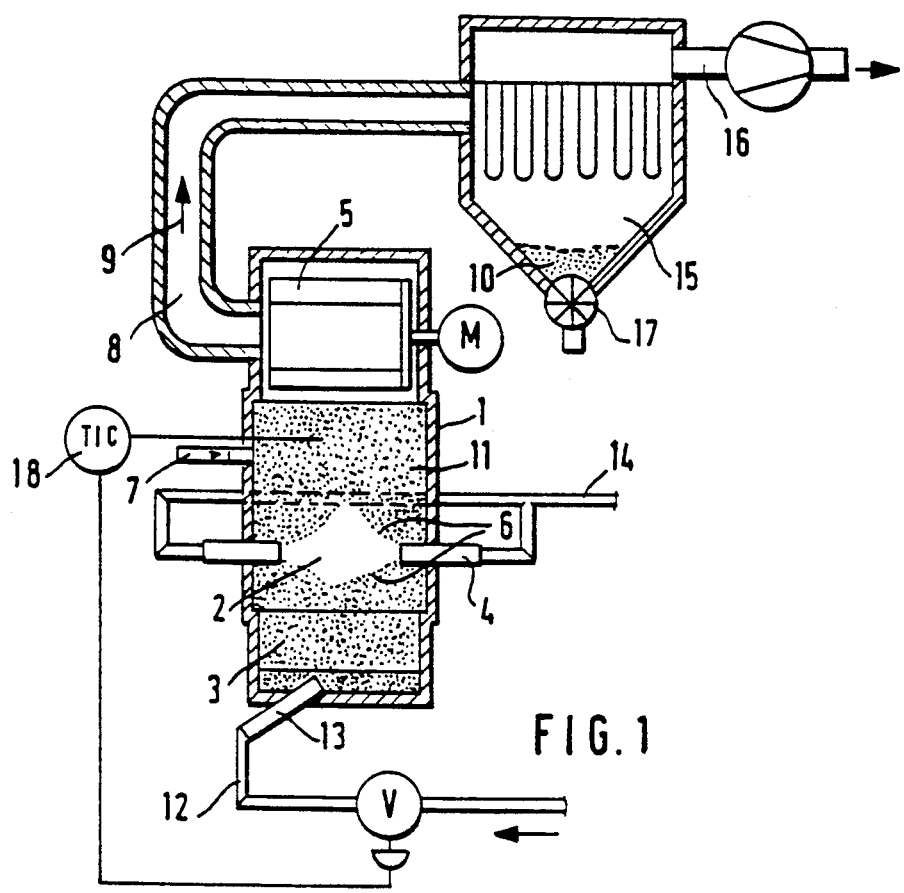
FIG. 1
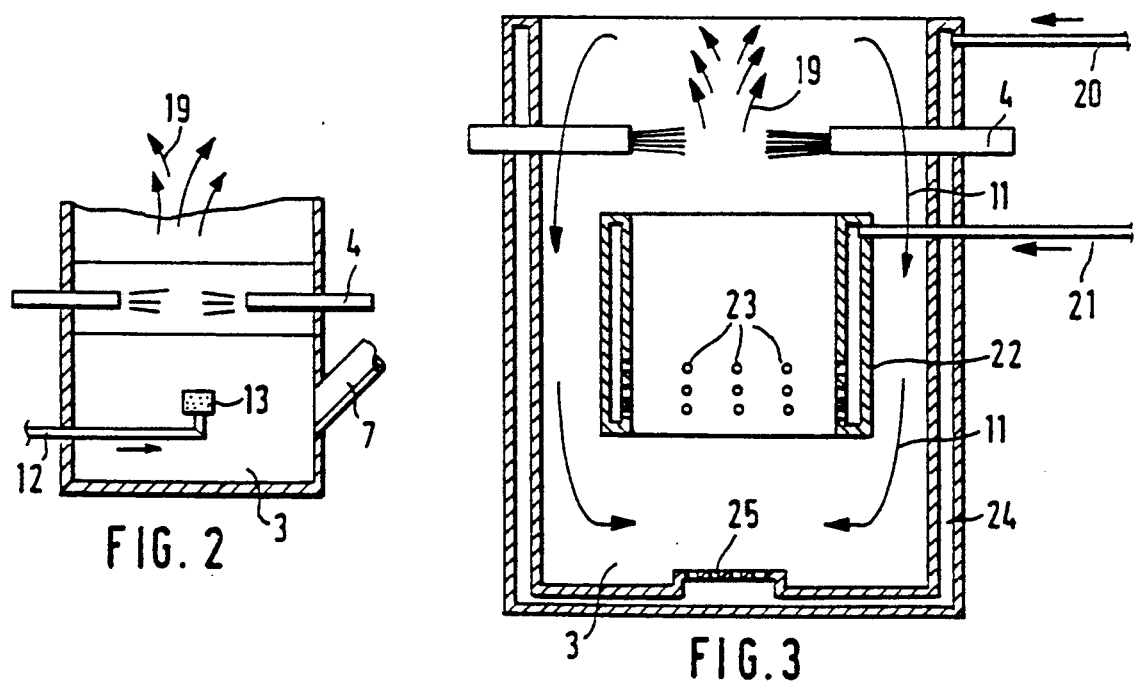
FIG. 2
FIG. 3

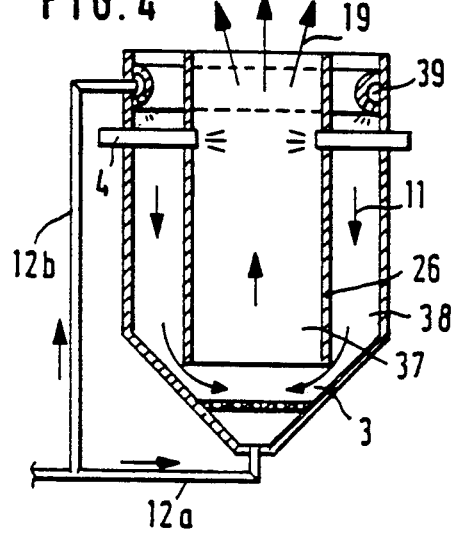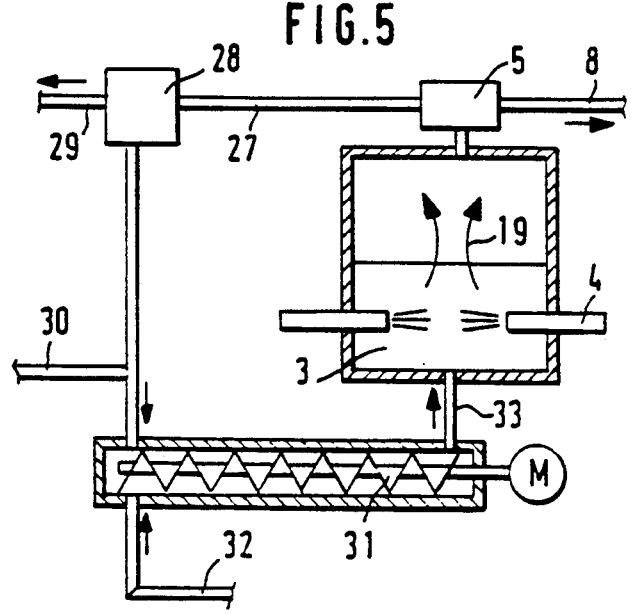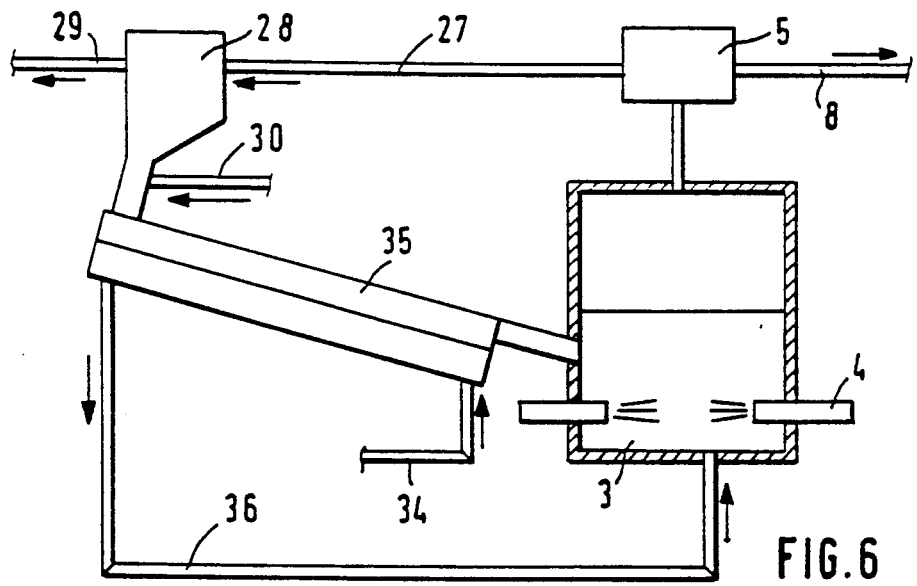

FINE-GRAINED POLYETHER-KETONE POWDER, PROCESS FOR THE MANUFACTURE THEREOF, AND THE USE THEREOF

CROSS-REFERENCE TO RELATED APPLICATION

The present application is a continuation of application Ser. No. 458,776, filed Dec. 29, 1989 now abandoned.

The invention relates to a fine-grained polyether-ketone, to the manufacture thereof in a fluid-bed opposed-jets mill and to the use of the powder especially for producing surface coatings.

Polyether-ketones are polymers which are obtained by nucleophilic or electrophilic condensation. They have been described extensively in an extremely large number of variations both with respect to their structure their preparation and their properties and possible applications. The polyether-ketones are highly esteemed by those skilled in the art, in particular because of their outstanding property pattern. They are high temperature-resistant, have very good mechanical properties and are extremely resistant to chemical and environmental influences. They have the disadvantage, however, that it is difficult to obtain them as a finely grained powder. It is therefore also impossible to obtain crack-free, uniform and, in particular, smooth coatings, for example coatings on metal surfaces, by means of flame-coating. However, the known polyether-ketone powders or grains are frequently also insufficiently fine for other processes and purposes such as, for example, electrostatic spray-coating, whirl-sintering, ram extrusion, the production of pressed composites and the like. Some of the known powders are also acicular and therefore tend to felting.

Recently, a process for pulverizing PEEK has been disclosed, which is said to allow the production of powders having a 97% content of grain sizes of less than 20 $\mu$m ("Plastics Engineering", 44 (1988) issue No. 9, page 63). Our own tests have shown, however, that the data given therein are insufficient for repeating the process or obtaining a powder of this fineness.

The commercially available polyether-ketones ®VICTREX PEEK 150 and VICTREX PEEK 450 PF have grain sizes of about 100 $\mu$m. However, the size of the grain and the relatively wide grain size distribution of these products are disadvantageous. No satisfactory results are therefore obtained in the powder-coating of metals or in sintering processes.

It is the object of the invention to overcome the disadvantages mentioned and to provide a fine-grained polyether-ketone powder having enhanced sphericity and a process for the manufacture thereof.

A further object is to obtain a granulated polyether-ketone powder which is largely free of abrasion by the grinding device. This is particularly important for a faultless surface quality of the coatings.

The invention relates to a fine-grained polyether-ketone powder which has a mean grain size ($d_{50}$ value) smaller than or equal to 40 $\mu$m, preferably smaller than or equal to 30 $\mu$m and especially smaller than or equal to 20 $\mu$m. Further data which are important for characterizing the powder are the $d_{90}$ value which is smaller than or equal to 70 $\mu$m, preferably smaller than or equal to 50 $\mu$m, and the $d_{10}$ value which is smaller than or equal to 15 $\mu$m, preferably smaller than or equal to 10 $\mu$m. This gives the distribution range, which can be calculated from the difference $d_{90}$ minus $d_{10}$. It has values of smaller than or equal to 55 $\mu$m, preferably smaller than or equal to 40 $\mu$m and especially smaller than or equal to 20 $\mu$m. The distribution range defines the range of the grain size distribution in the powders; the smaller the value, the better is the processability and hence the structure of the molding obtained.

The term polyether-ketones includes all polymers which have recurring units

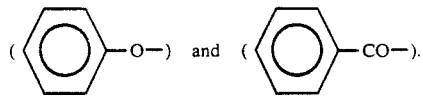

These units are mutually linked in various ways, in general in the p-position. According to general parlance, the first unit is designated as "E" (ether) and the second unit as "K" (ketone). Thus, the abovementioned polyether-ketone is described as PEEK. Preferred polyether-ketones according to the invention are those of the PEK and PEKK types, and PEEKK is particularly preferred. However, these polymers can also contain other recurring units as copolymer constituents, selected from the group comprising EKEEK, EEK, EEKK, and EKK, but as a rule in quantities of not more than 40%, preferably not more than 20% and particularly preferably not more than 5 mol %.

With a view to the versatile applicability of the polyether-ketone powders according to the present invention, the powders can have a melt index MFI from 400 to 1.0 g, measured at 400° C. in 10 minutes (ASTM D 1238). Their melting point is in general above 250° C., preferably above 300° C. and especially above 350° C., and their softening point is in general above 130°0 C.

Moreover, the invention also relates to a process for producing the fine-grained polyether-ketone powders, in which coarse-grain polyether-ketone is cold-ground in a fluid-bed opposed-jets mill having a grinding chamber (2) subjected to gas jets, a grinding material-charging device, a screening device (5) for separating coarse material (11) and fine material (10), and a bottom (3) underneath the grinding chamber for added material to be ground and coarse material flowing back from the screening device, the material to be ground and the coarse material flowing back from the screening device being cooled by means of a cryogenic refrigerant.

Jet mills are comminuting machines known for a long time, in which the particles to be comminuted are accelerated by gas streams and comminuted by mutual impingement. There are a number of different jet mill designs. They differ in the type of gas flow, in the type of impingement of the particles on one another or on an impingement surface and in whether the particles to be comminuted are carried along in the gas jet or whether the gas jet impinges upon the particles and entrains them. The grinding gas used is normally air or superheated steam.

In the fluid-bed opposed-jets mill, freely expanding gas jets impact upon one another in a grinding chamber which contains the grinding material in the form of a fluid bed. Grinding takes place here virtually exclusively by mutual impingement of the grinding material particles upon one another, and grinding is therefore almost free of wear. The fluid-bed opposed-jets mill is associated with a screening device in which the fines obtained are separated off from the coarse material which has not yet been sufficiently comminuted. The coarse material is returned into the grinding chamber.

Many materials, for example, plastics, can be ground to fine grain sizes only with difficulty or not at all, because of their toughness. The grinding properties of such tough materials can be improved by cooling, which results in an embrittlement of the materials. The propellant gas stream in jet mills is therefore cooled, as is described, for example, in German Offenlegungsschrift 2,133,019. Cooling of the propellant gas stream allows materials to be ground which will not be grindable in jet mills under normal conditions. In spite of intensive cooling, for example with liquid nitrogen, and in spite of the cooling of the propellant gas stream itself due to its expansion, the achievable improvement in grindability still, however, leaves much to be desired. Fine grain sizes can admittedly be reached, but only with extremely high consumption of time and energy.

The process according to the invention therefore achieves the object of allowing super-fine grinding of polyetherketones to hitherto virtually unattainable very fine grain sizes with a substantial increase in throughput, coupled with a low consumption of energy and refrigerant. In this case, it is not the propellant gas stream, but the circulating coarse material which is cooled by a cryogenic refrigerant. The measure according to the invention has the effect of a step change in improving the results of grinding, as can be seen from the results listed in the table.

By means of the process according to the invention, a considerable increase in throughput as compared with grinding under normal conditions can be achieved in fluid-bed opposed-jets mills. Particles of highest fineness with a corresponding increase in surface area and a smooth surface structure can produced with polyetherketones. The end product becomes readily flowable and has a high bulk density and tap density.

The refrigerants used can above all be liquefied gases, in particular nitrogen, but also carbon dioxide. In the simplest and frequently most appropriate case, these can be fed directly into the bottom of the mill. Of course, indirect cooling of the coarse material is also possible. Indirect cooling can also be effected by other refrigerants, for example brine baths.

A few illustrative examples of the invention will be explained by reference to the attached drawings, in which:

FIG. 1 shows a fluid-bed opposed-jets mill in a diagrammatic form,

FIG. 2 shows the cooling of the bottom of the fluid-bed opposed-jets mill of FIG. 1, FIG. 3 shows a mixed form of direct and indirect cooling of the bottom, FIG. 4 shows an embodiment similar to FIG. 3, but exclusively with direct cooling, FIG. 5 shows direct cooling of the coarse material flowing back outside of the bottom of the mill, and FIG. 6 shows indirect cooling of the coarse material flowing back outside of the bottom of the mill.

In the description which follows, the same reference symbols have been used in all figures for the same parts.

FIG. 1 shows the fluid-bed opposed-jets mill in a diagrammatic form. The mill comprises a housing 1 which contains the grinding chamber 2 and the bottom 3. The propellant gas enters the grinding chamber 2 through the nozzles 4. The housing 1 is adjoined by the screening device 5. The coarse material to be ground is in the form of a fluid bed 6 in the grinding chamber. The grinding material is fed in through the lock 7. The fines 10 separated off in the screening device 5 are withdrawn through the fines outlet 8, as indicated by the arrow 9, and fed to the filter unit 15. The latter possesses a branch 16 for the exit gas and a discharge lock 17 for the fines 10 produced. The coarse material 11 flows from the screening device 5 back into the grinding chamber 2. The propellant gas charged to the nozzles 4 is introduced through the feed line 14.

According to the invention, the coarse material present in the bottom 3 of the mill is cooled down by liquid nitrogen. The latter is introduced through the line 12 and the porous charging body 13. Porous charging bodies are particularly suitable for small mills. For mills of larger diameters, other charging systems, for example nozzle plates, are to be preferred, in order to enable the nitrogen to be introduced as finely divided as possible. The nitrogen feed through the line 12 and the porous charging body 13 takes place as a function of the temperature control 18. The charging of the grinding material through the lock 7 can also take place directly into the bottom 3. The fines fraction of the fine material 10 is determined by the speed of rotation of the screening device 5. The coarse material 11 flowing back from the screening device 5 together with the grinding material entering from the lock 7 forms the fluid bed 6. The liquid nitrogen entering through the porous charging body 13 vaporizes and cools the bottom of the mill, i.e. the coarse material 11 flowing back from the screening device 5 and any freshly charged grinding material. The vaporized cold nitrogen flows off upwards through the material and enters the grinding zone. Cold gas, coarse material and grinding material form a first fluid-bed zone underneath the grinding chamber 2 in the bottom 3.

FIG. 2 shows the lower part of the fluid-bed opposed-jets mill of FIG. 1 in a diagrammatic form, but with the lock 7 for the grinding material located directly on the bottom 3. The arrows 19 clearly indicate the mixture of cold gas, propellant gas, coarse material and fine material flowing upwards to the screening device.

FIG. 3 shows a variant with indirect and direct heat exchange between the nitrogen feed and grinding material. The liquid nitrogen is fed through the lines 20 and 21. The liquid nitrogen entering through line 21 passes into a double-walled pipe 22 closed at the end faces. This double-walled pipe 22 has inward-pointing outlet orifices 23. The entire lower part of the mill housing is likewise constructed as a double-walled chamber 24. The line 20 leads into the latter. The chamber 24 has outlet orifices 25, arranged in the bottom 3, for the nitrogen fed through the line 20. The coarse material 11 flowing back from the screening device is therefore first cooled indirectly in the region between the doubled-walled tube 22 and the chamber 24. Subsequently, direct cooling takes place by the nitrogen issuing from the outlet orifices 23 and 25.

Depending on the mode of operation, this nitrogen can be still liquid or already gaseous.

FIG. 4 shows another embodiment similar to FIG. 2, but with an extended bottom 3. A certain type of flow is here impressed upon the coarse material 11 and the cold gas by a pipe-shaped apron 26. The apron 26 separates the grinding chamber into a central shaft 37, where the grinding process takes place, and an annular shaft 38 for the coarse material flowing back. Liquid nitrogen feed takes place at two points, namely through line 12a directly into the bottom 3 and through line 12b into a spray system 39 in the annular shaft 38. Accordingly, the nitrogen introduced through line 12b directly cools the coarse material flowing back from the screening device.

FIG. 5 shows a variant with direct but external heat exchange between refrigerant and coarse material. The coarse material separated off in the externally arranged screening device 5 passes through the line 27 into the filter 28. The exit gas escapes through line 29, while the coarse material together with any grinding material added through the line 30 enters a helical screw 31. Liquid nitrogen entering through the line 32 is fed to the helical screw 31. The mixture of cooled coarse material and vaporized nitrogen flows through line 33 into the bottom 3.

FIG. 6 shows a variant of the embodiment according to FIG. 5. The coarse material from the filter 28 and any grinding material from the line 30 here enter a heat exchanger 35. From there, they pass indirectly cooled into the bottom 3. The cooling is effected by liquid nitrogen which is introduced through line 34 into the heat exchanger 35. Vaporized gaseous nitrogen then passes as cold gas through the line 36 likewise into the bottom 3, where subsequent further direct cooling takes place.

There are still numerous further possibilities for cooling the coarse material flowing back from the screening device by a refrigerant. For example, a plurality of grinding zones with a bottom can be arranged in series in the form of a cascade. In this case, the mixture of fines and coarse material leaving the grinding zone is separated from the exit gas in the filter and fed to the next grinding zone. The bottom located underneath each grinding zone is here cooled according to the invention. A screening device is associated only with the last stage.

The fine-grained polyether-ketones according to the invention can advantageously be used for coating surfaces, for example by flame-coating, electrostatic spray-coating, whirl-sintering or ram extrusion. Furthermore, they are outstandingly suitable for sintering processes, for example for producing pressed composites.

EXAMPLES

As the starting point for the tests, a polyether-etherketone-ketone (PEEKK) having a melt index MPI of 15 g (400° C./10 min) was used. The particle sizes of this starting material are listed in the table. Moreover, two commercially available polyether-ketones from ICI under the names ®Victrex PEEK 150 P and Victrex PEEK 450 PF (V1 and V4 and V5 respectively) were used as a comparison. Examples 2 and 3 represent examples according to the invention.

The particle size analysis was carried out on a suspension of solid, water and wetting agent based on nonylphenol polyglycol ether, using a commercially available laser granulometer (Manufacturer: Cilas, 91460 Marcousse, France). The $d_{10}$, $d_{50}$ and $d_{90}$ values were chosen as representative values. For example, the $d_{10}$ value of 6.4 μm in Example 2 means that 10% of the end product have a particle size of 6.4 μm. Examples 2 and 3 differ in this respect to the speed of rotation of the screening device and the product throughput rate.

| Examples | V1 | 2 | 3 | V4 | V5 |
|---|---|---|---|---|---|
| Product | PEEKK* | PEEKK | PEEKK | VICTREX 150P | VICTREX 450 PF |
| Nozzle number | — | 3 | 3 | — | — |
| Nozzle angle (°) | — | 120 | 120 | — | — |
| Diameter (mm) | — | 8 | 8 | — | — |
| Speed of rotation of the screening device (min$^{-1}$) | — | 4,500 | 3,000 | — | — |
| Gas throughput rate (m$^3$/h) | — | 813 | 813 | — | — |
| Product throughput rate (kg/h) | — | 5 | 7.5 | — | — |
| Grinding pressure (bar) | — | 6 | 6 | — | — |
| Running time (min) | — | 120 | 120 | — | — |
| Bottom cooling (°C.) | — | −40 | −40 | — | — |
| Particle sizes: | | | | | |
| $d_{10}$ (μm) | 35 | 6.4 | 11.7 | 32 | 20.2 |
| $d_{50}$ (μm) | 350 | 16.1 | 24.7 | 100 | 46.8 |
| $d_{90}$ (μm) | 1,200 | 31.2 | 42.5 | 160 | 82.6 |
| Distribution range: $d_{90}-d_{10}$ (μm) | 1,165 | 24.8 | 30.8 | 128 | 62.4 |

*Starting material

The table shows that the distribution range decreases when the speed of rotation of the screening device increases and the product throughput decreases, i.e. a product having a uniform particle size properties is obtained in Example 2. A further advantage of these polyether-ketone powders is the largely spheroidal form of the PEK particles. The increased sphericity of the particles leads to an improved flowability as compared with the hitherto known processes. The flowability is important for uniform application in use, for example in metal coating. Due to the agglomeration tendency of the known powders, non-uniform surfaces can result from the hitherto known grinding processes. However, a uniform surface is a prerequisite for the quality of the surface. Hitherto, only crazed surfaces were obtainable, whereas smooth surfaces are obtained with the polyether-ketone powders according to the invention.

We claim:

1. A fine-grained polyether-ketone powder, wherein the grain size has a $d_{50}$ value mean grain size smaller than or equal to 40 μm and the grain size distribution range is smaller than or equal to 55 μm.

2. A polyether-ketone powder as claimed in claim 1, wherein the $d_{50}$ value is smaller than or equal to 30 μm, and the grain size distribution range is smaller than or equal to 40 μm.

3. A polyether-ketone powder as claimed in claim 1, wherein both the $d_{50}$ value mean grain size and the grain size distribution range are smaller than or equal to 20 μm.

4. A polyether-ketone powder as claimed in claim 1, wherein the polyether-ketone has a melt index from 400 to 1.0 g (400° C./10 min).

5. A polyether-ketone powder as claimed in claim 1, wherein the polyether-ketone is a member selected from the group consisting of PEK, PEEK, PEEKK, PEKK or a mixture thereof.

6. A polyether-ketone powder as claimed in claim 5, wherein the polyether-ketones, are co-condensates which contain up to 40 mol % of a member selected from the group consisting of EKEEK, EEK, EEKK, and EKK.

7. A process for cold-grinding coarse-grained polyetherketone which comprises grinding said polyetherketone in a fluid-bed opposed-jets mill having a grinding chamber (2) subjected to gas jets, a grinding material-charging device, a screening device (5) for separating coarse material (11) and fine material (10), and a bottom (3) underneath the grinding chamber for added material to be ground and coarse material flowing back from the screening device, and cooling the material to be ground and the coarse material flowing back from the screening device by means of a cryogenic refrigerant.

8. The process as claimed in claim 7, wherein the cryogenic refrigerant is contacted in a finely divided form with the coarse material.

9. The process as claimed in claim 7, wherein the cryogenic refrigerant is introduced into the bottom.

10. The process as claimed in claim 7, wherein the coarse material is cooled directly by a cryogenic refrigerant.

11. The process as claimed in claim 7, wherein the coarse material is cooled indirectly.

12. The process as claimed in claim 7, wherein liquid nitrogen or carbon dioxide is used as the cryogenic refrigerant.

13. A surface coating, produced from the powder as claimed in claim 1.

14. A composite, produced from the powder as claimed in claim 1.

15. A polyether-ketone powder as claimed in claim 1, wherein the polyether-ketone has a melting point above 250° C. and a softening point above 130° C.

16. A process as claimed in claim 7, which is affected by means of a fluid-bed opposed jets mill.

* * * * *

UNITED STATES PATENT AND TRADEMARK OFFICE
CERTIFICATE OF CORRECTION

PATENT NO. : 5,247,052
DATED : September 21, 1993
INVENTOR(S) : Andreas Lucke, et al It is certified that error appears in the above-indentified patent and that said Letters Patent is hereby corrected as shown below:

Column 3, line 35, after "can" insert -- be --.

Column 6, line 59, after "value" insert -- mean grain size --.

Signed and Sealed this

Twenty-ninth Day of March, 1994

Attest:

BRUCE LEHMAN

*Attesting Officer*  *Commissioner of Patents and Trademarks*